(12) United States Patent
Furukawa et al.

(10) Patent No.: US 8,558,541 B2
(45) Date of Patent: Oct. 15, 2013

(54) MONITORING SYSTEM OF CONVEYOR BELT

(75) Inventors: Kazuya Furukawa, Yokohama (JP); Yukinobu Nishikita, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 358 days.

(21) Appl. No.: 12/669,751

(22) PCT Filed: Jul. 11, 2008

(86) PCT No.: PCT/JP2008/062580
§ 371 (c)(1),
(2), (4) Date: Jan. 19, 2010

(87) PCT Pub. No.: WO2009/011306
PCT Pub. Date: Jan. 22, 2009

(65) Prior Publication Data
US 2010/0182001 A1    Jul. 22, 2010

(30) Foreign Application Priority Data
Jul. 18, 2007    (JP) .................................. 2007-187196

(51) Int. Cl.
*G01N 27/72*    (2006.01)
(52) U.S. Cl.
USPC .. 324/228; 324/241; 324/207.16; 324/207.21
(58) Field of Classification Search
USPC ................. 324/241, 228; 198/810.01–810.04
See application file for complete search history.

(56) References Cited

U.S. PATENT DOCUMENTS

| 3,750,129 | A | * | 7/1973 | Takeno et al. ............. 198/810.02 |
| 4,020,945 | A | * | 5/1977 | Takeno et al. ............. 198/810.02 |
| 4,409,852 | A |   | 10/1983 | Suzuki et al. |
| 5,148,378 | A | * | 9/1992 | Shibayama et al. .......... 702/116 |
| 5,923,165 | A | * | 7/1999 | Horita et al. .................. 324/239 |
| 7,245,123 | B2 | * | 7/2007 | Inoue et al. .................... 324/209 |
| 7,432,719 | B2 | * | 10/2008 | Nozaki ......................... 324/522 |
| 2006/0219528 | A1 |   | 10/2006 | Aizawa et al. |

FOREIGN PATENT DOCUMENTS

| JP | 50-145178 A | 11/1975 |
| JP | 51-43578 A | 4/1976 |
| JP | 57-048521 A | 3/1982 |
| JP | 02-143117 A | 6/1990 |
| JP | 08-244952 A | 9/1996 |
| JP | 2000-19235 A | 1/2000 |
| JP | 2005-138979 A | 6/2005 |
| JP | 2006-315858 A | 11/2006 |
| WO | 2007/029698 A1 | 3/2007 |
| WO | 2007037183 A1 | 4/2007 |
| WO | 2009/028667 A1 | 3/2009 |

OTHER PUBLICATIONS

Japanese Office Action dated Dec. 21, 2012 issued in corresponding Japanese Patent Application No. 2009-523632.

* cited by examiner

*Primary Examiner* — Arleen M Vazquez
*Assistant Examiner* — Alesa Allgood
(74) *Attorney, Agent, or Firm* — Sughrue Mion, PLLC

(57) ABSTRACT

A monitoring system including rubber magnets 41 to 44 provided inside of a belt 1, and magnetic sensors 51 and 52 provided outside of the belt 1, and magnetic forces generated by the rubber magnets 41 to 44 are detected by the magnetic sensors 51 and 52, thereby detecting a condition of the belt 1, wherein the magnetic sensors 51 and 52 are configured using MI sensors.

9 Claims, 11 Drawing Sheets

MONITORING SYSTEM OF CONVEYOR BELT

TECHNICAL FIELD

The present invention relates to a monitoring system of a conveyor belt to detect an abnormality of the conveyor belt.

Priority is claimed on Japanese Patent Application No. 2007-187196, the content of which is incorporated herein by reference.

BACKGROUND ART

There is a monitoring system (abnormality detecting device) of a conveyor belt in which a belt is provided with a transmission unit that transmits a predetermined signal to detect abnormalities in the belt which is operating, and a reception unit close to the belt receives the transmitted signal, thereby detecting the condition of the belt. In such a system, a magnetic force is generally used for the transmission unit and the reception unit (e.g., Patent Document 1). As a magnetic sensor used for the reception unit, there are many magnetic sensors such as a gauss meter, a Hall element, and a loop coil (e.g., Patent Document 2).

In addition, recently an MI sensor (magnetic impedance sensor) has been attracting attention as a low-cost and satisfactory sensitivity magnetic sensor (e.g., Patent Document 3).

The Hall element is one type of magnetic sensor using the electromagnetic conversion operation (galvanomagnetic effect operation), and generally a semiconductor of a compound with high mobility such as InSb (indium antimonide) and GaAs (gallium arsenide) is used as a raw material of the element. When a predetermined current is allowed to flow into the Hall element or a voltage is applied to the Hall element to apply a magnetic field at a right angle thereto, an electromotive force proportional to magnetic flux is generated between the output terminals.

The loop coil (search coil) is one type of magnetic sensor using the electromagnetic induction operation, and a voltage proportional to variation in time of magnetic flux interlinked to the coil is output from both ends of the coil. The loop coil outputs voltage according to variation in magnetic flux, and thus cannot detect a static magnetic field in which there is no variation in magnetic flux.

Meanwhile, the MI sensor is a sensor using a magnetic impedance effect (MI effect), and has a magnetic field detection sensitivity of 10,000 times or greater than that of the Hall element or the like. As shown in FIG. 15, the MI effect is as follows: when a pulse current with a high frequency (1 MHz or higher) generated by a high-frequency power supply 72 is allowed to flow into an amorphous magnetic metal wire 71 and a magnetic field (external magnetic field) is applied from the outside in this state, impedance of the wire 71 is drastically varied.

[Patent Document 1] Japanese Unexamined Patent Application, First Publication No. S57-48521
[Patent Document 2] Japanese Unexamined Patent Application, First Publication No. H08-244952
[Patent Document 3] Japanese Unexamined Patent Application, First Publication No. 2000-19235

DISCLOSURE OF THE INVENTION

Problem to be Solved by the Invention

In a monitoring system of a belt conveyor, when a magnetic sensor of a reception unit is formed from a Hall element (gauss meter), a complex circuit for output correction such as a zero reset is needed to raise detection sensitivity without reinforcing the magnetic force, or the configuration becomes large to protect the circuit from rainwater, thereby increasing the cost of the reception unit. When a plurality of reception units is provided, the whole system becomes expensive and the general use property of the system decreases.

Meanwhile, when a loop coil is used, the cost is low. However, since sensitivity is low and the waveform is complex, it is difficult to perform highly precise detection. In addition, there may be the case of needing to raise the magnetic force of a transmission unit magnet or to increase the size thereof, as compared with magnetic sensors using other methods.

When the size of the magnet is increased to raise the magnetic force, the bonding between the belt rubber and the magnet is difficult and peeling off occurs easily therebetween. Accordingly, a problem that belt bending durability may deteriorate or the possibility of detaching the magnet may increase is conceivable. Meanwhile, raising the magnetic force without increasing the size of the magnet results in the magnet becoming expensive (high costs for the overall system are not solved).

The magnetic force of the magnet may be decreased by impact from transported objects or bending at a pulley. Accordingly, problems, such as misdetection over long-term usage may be caused or difficulties in performing highly-precise analysis, are conceivable.

In known reception units (magnetic sensors) such as gauss meters, Hall elements, and loop coils, the output voltage in the state where an external magnetic field is not applied, that is, the ground level is zero. For this reason, for example, when the output voltage is continuously in the state of 0 V, it is uncertain whether the magnet (which generates a magnetic force) constituting the transmission unit does not pass through the vicinity of the reception unit and the normal reception unit cannot detect its magnetic force, or the magnet passes normally but the magnetic sensor is out of order by an external factor and thus the voltage is not output.

That is, any sensor (both the gauss meter and loop coil) has a ground level (normal time) of 0 V, and generates a voltage only when the sensor receives a signal. Accordingly, it is difficult to immediately determine an abnormal (defective) sensor only by monitoring the sensor output. Thus, there is a problem that it is difficult to perform simply, in a short time, determination of a signal fault caused by detachment of the magnet on the belt side and determination of a signal fault caused by the abnormal sensor.

The invention has been made in consideration of the above-described circumstances, and an object of the invention is to provide a monitoring system of a conveyor belt capable of solving the problems as compared with the known monitoring systems. More specifically, the object is to provide a belt monitoring system in which a reception unit is improved as compared with the known monitoring systems, and to provide a belt monitoring system capable of decreasing the cost of the whole system and reducing the limited elements (aspect, size, magnetic force, etc. of the magnet) of a transmission unit embedded in (or attached to) a belt, by using an MI sensor (magnetic impedance sensor) with low cost, small size, and stable performance. Another object of the invention is to provide a monitoring system of a conveyor belt capable of accurately determining a sensor abnormality.

Means for Solving the Problem

To solve the above-described problems, according to a first aspect of the present invention, there is provided a monitoring system of a conveyor belt including a magnetic force generating means that is provided inside a belt, and a magnetic sensor that is provided outside of the belt, wherein a magnetic force generated by the magnetic force generating means is detected by a magnetic sensor to detect the condition of the belt, and wherein the magnetic sensor is configured using an MI sensor.

According to a second aspect of the present invention, there is provided a monitoring system of a conveyor belt including a magnetic force generating means that is provided in a belt, and a magnetic sensor that is provided outside of the belt, wherein a magnetic force generated by the magnetic force generating means is detected by a magnetic sensor to detect the condition of the belt, wherein the magnetic sensor is configured using an MI sensor, and wherein the monitoring system of the conveyor belt is provided with a determination means for determining that the magnetic sensor is in an abnormal state when a period of time where an output value of the magnetic sensor deviates from a predetermined range is longer than a predetermined period of time.

According to a third aspect of the present invention, a plurality of the magnetic force generating means is provided in the longitudinal direction of the belt, and an interval of time when the magnetic sensor detects magnetic forces generated by the plurality of magnetic force means is calculated to detect the condition of the belt.

According to a fourth aspect of the present invention, the magnetic force generating means is attached to the belt so as to have a regular thickness, wherein a plurality of the magnetic sensors is arranged in the widthwise direction of the belt, and the condition of the belt is detected on the basis of the values detected by the magnetic sensors.

According to a fifth aspect of the present invention, the magnetic force generating means are separately arranged at least at two parts in the widthwise direction of the belt, a plurality of the magnetic sensors is arranged in the widthwise direction of the belt, and the condition of the belt is detected on the basis of the values detected by the magnetic sensors.

According to a sixth aspect of the present invention, the magnetic force generating means are embedded to extend in the widthwise direction of the belt.

According to a seventh aspect of the invention, the magnetic force generating means have flat plate magnets formed of elastic materials magnetized by containing particles of a magnetic element that generates a magnetic force.

According to an eighth aspect of the present invention, the magnetic force generating means are provided with a stair portion where a plurality of the flat plate magnets is provided in a stair shape from a core element of the belt to an intermediate portion between the core element and the surface of the belt, and a slope portion that is provided to be inclined from a position of the flat plate magnet closest to the surface of the belt in the stair portion toward the surface of the belt in the arrangement direction of the flat plate magnets.

According to a ninth aspect of the present invention, the magnetic force generating means are provided with a stair portion where a plurality of flat plate magnets is provided in a stair shape from a core element of the belt to an intermediate portion between the core element and the surface of the belt, and a slope portion that is adjacent to the stair portion in the longitudinal direction of the belt and is provided to be inclined from the core element of the belt toward the surface of the belt.

Effect of the Invention

According to the first aspect of the present invention, the magnetic sensor is configured using the MI sensor (magnetic sensor based on the MI effect), and thus it is possible to obtain stable performance with low cost as compared with the case where the magnetic sensor is configured by a Hall element or a loop coil. In addition, limits in the magnetic force or size of the magnetic force generating means are reduced, and thus the degree of freedom in selection of the magnetic force generating means is increased and the degree of freedom in layout is also increased. Accordingly, the degree of freedom of the whole system is improved. Since the magnetic sensor is configured using the MI sensor, it is possible to improve sensitivity in detection of the magnetic force and to improve precision in detecting the condition of the belt.

When the ground level (output voltage when the external magnetic field is zero) is not set to be 0 V, means for detecting the time when the output of the magnetic sensor is continuously 0 V is provided and thus the sensor can be determined as abnormal within a short time. Accordingly, the system can promptly determine sensor abnormalities, and trouble shooting is rapidly performed.

According to the second aspect of the present invention, the magnetic sensor is configured using the MI sensor, and a determination means is provided which determines that the magnetic sensor is in an abnormal state when the period of time where the output value of the magnetic sensor deviates from a predetermined range is longer than a predetermined period of time. Accordingly, the system can determine sensor abnormalities, and trouble shooting is rapidly performed.

According to the third aspect of the present invention, the plurality of magnetic force generating means are provided in the longitudinal direction of the belt, and the interval of time when the magnetic sensor detects the magnetic forces generated by the plurality of magnetic force generating means is calculated to detect the condition of the belt. Accordingly, it is possible to detect that the interval between the magnetic force generating means increases when the interval of time increases, that is, the belt extends.

According to the fourth aspect of the present invention, the magnetic force generating means is attached to the belt so as to have a regular thickness, the plurality of magnetic sensors are arranged in the widthwise direction of the belt, and the condition of the belt is detected on the basis of the values detected by the magnetic sensors. Accordingly, it is possible to detect that the thickness of the magnetic force generating means is not regular, that is, one-sided abrasion occurs in the belt, when the detected values of the magnetic values and variation thereof with the passage of time fluctuate.

According to the fifth aspect of the present invention, the magnetic force generating means are separately arranged at least at two parts in the widthwise direction of the belt, the plurality of magnetic sensors are arranged in the widthwise direction of the belt, and the condition of the belt is detected on the basis of the values detected by the magnetic sensors. Accordingly, when it is confirmed that at least two magnetic force generating means are separated from each other from the values detected by the magnetic sensors, it is possible to detect that the gap between the two magnetic force generating means increases, that is, a longitudinal split is about to occur in the belt. In addition, it is possible to perform meandering detection by detecting positional variation of the magnets embedded in the widthwise direction.

According to the sixth aspect of the present invention, the magnetic force generating means are embedded to extend in the widthwise direction of the belt. Accordingly, it is possible to detect the abrasion condition of the belt at any position in the widthwise direction of the belt corresponding to the positions of the magnetic sensors, and it is possible to detect one-sided abrasion of the belt in detail.

According to the seventh aspect of the present invention, the magnetic force generating means are formed on the elastic elements, and thus it is possible to generate magnetic forces without spoiling flexibility of the belt. The impact applied from conveyed objects loaded on the belt to the magnetic force generating means embedded in the belt is absorbed, and thus durability of the magnetic force generating means is improved.

According to the eighth aspect of the present invention, in the slope portion, abrasion of the belt can be detected by the flat plate magnet formed of one elastic material, and thus the flat plate magnet of the slope portion can be disposed at a steep angle within the range of the sensitivity of the MI sensor. In the stair portion provided close to the core element of the belt, the flat plate magnets are sequentially scraped away one by one from the surface side of the belt as the belt is gradually worn away.

For this reason, the variation in magnetic force generated by the flat plate magnets is relationally associated with the amount of abrasion of the belt by predetermining the embedding depths of the flat plate magnets, and it is possible to detect with high precision the abrasion state of the belt at the last stage of abrasion. As a result, the embedding length of the magnetic force generating means into the belt in the longitudinal direction of the belt is shortened while improving the precision in detection of the abrasion condition of the belt at the last stage of abrasion.

According to the ninth aspect of the present invention, in the slope portion, abrasion of the belt can be detected by the flat plate magnet formed of one elastic material, and thus the flat plate magnet of the slope portion can be disposed at a steep angle within the range of the sensitivity of the MI sensor. In the stair portion provided close to the core element of the belt, the flat plate magnets are sequentially scraped away one by one from the surface side of the belt as the belt is gradually worn away.

For this reason, the variation in magnetic force generated by the flat plate magnets is relationally associated with the amount of abrasion of the belt by predetermining the embedding depths of the flat plate magnets, and it is possible to detect with high precision the abrasion condition of the belt at the last stage of abrasion. As a result, the embedding length of the magnetic force generating means into the belt in the longitudinal direction of the belt is shortened while improving the precision in detection of the abrasion condition of the belt at the last stage of abrasion.

When the surface of the belt is worn away until the stair portion provided from the core element to the intermediate portion of the belt in the thickness direction of the belt is exposed to the surface of the belt, the end portion of the flat plate magnet close to the stair portion is positioned at a position away from the stair portion. For this reason, turbulence in waveform caused by interference of the magnetic forces generated from the slope portion and the stair portion is reduced in the MI sensors, and thus complexity of analysis is reduced.

DESCRIPTION OF REFERENCE NUMERALS

1: CONVEYOR BELT (BELT)
1a: CORE ELEMENT
4, 41, 42, 43, 44, 45, 46, 47, 48a, 48b, 48c, 49a, 50a, 100a: RUBBER MAGNET (MAGNETIC FORCE GENERATING MEANS)
48, 100: STAIR PORTION
49, 50: SLOPE PORTION
5, 51, 52, 53, 501: MI SENSOR (MAGNETIC SENSOR)
61: PC
62: SIGNAL PROCESSING DEVICE
601: MAGNETIC SENSOR ABNORMALITY DETERMINING MEANS (DETERMINATION MEANS)

BEST MODE FOR CARRYING OUT THE INVENTION

Figure 1:
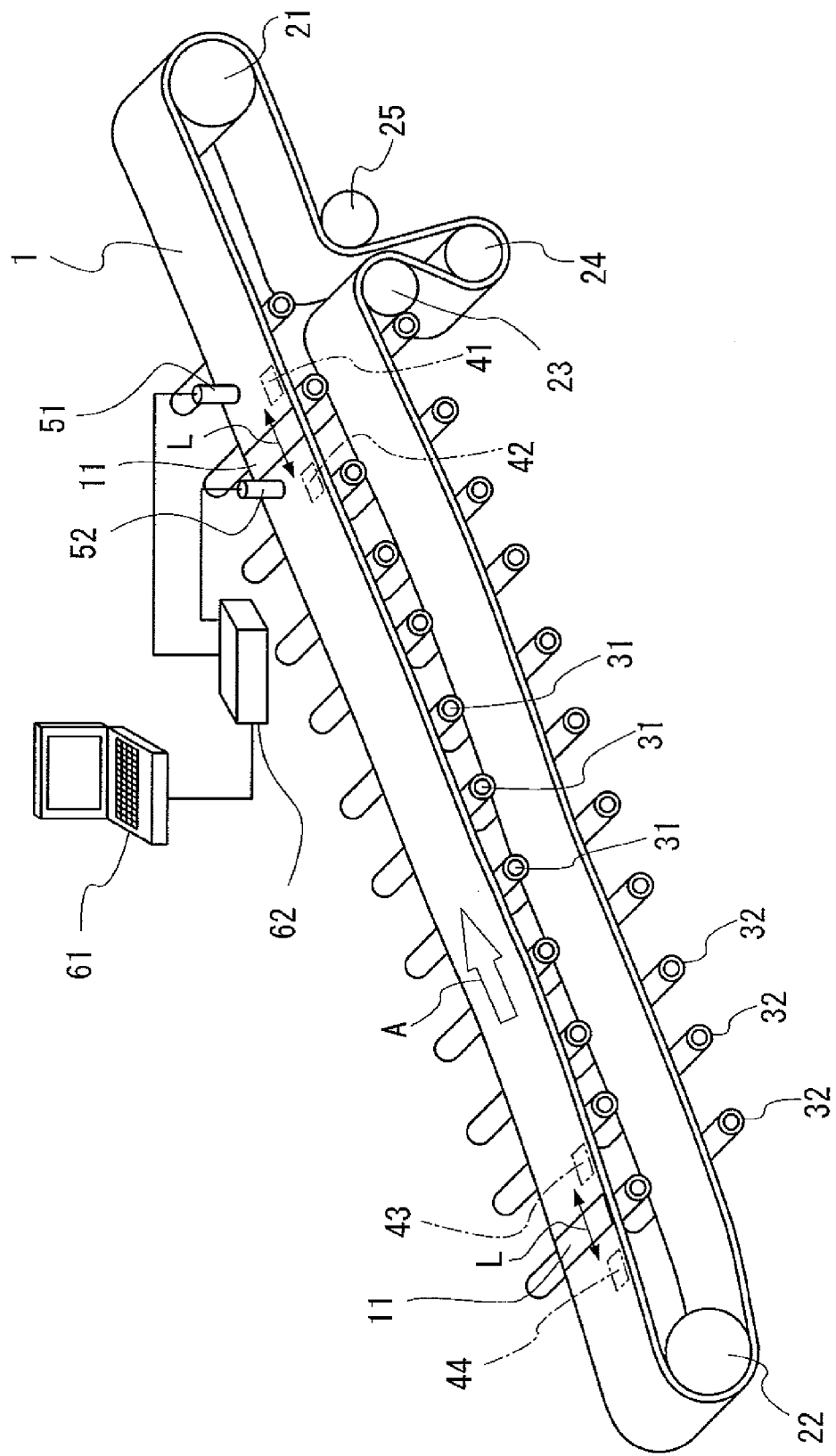
FIG. 1 is a schematic view illustrating an appearance of a monitoring system of a conveyor belt according to an embodiment of the present invention.

Hereinafter, embodiments of the present invention will be described with reference to the drawings. FIG. 1 is a schematic view illustrating an appearance of a monitoring system of a conveyor belt according to an embodiment of the present invention.

As shown in FIG. 1, a conveyor belt 1 (hereinafter, referred to as belt 1) is suspended on a head pulley 21 and a tail pulley 22 provided at both ends, and proceeds in a direction indicated by an arrow A by rotating the head pulley 21 with a motor (not shown) or the like. The belt 1 is provided with a tension device including a bend pulley 23, a tension pulley 24, and a bend pulley 25, to control the tension state. The side of the belt 1 to convey conveyed objects is supported by a plurality of carrier rollers 31, 31, 31, . . . , and the returning side of the belt 1 is supported by a plurality of return rollers 32, 32, 32, . . . .

Rubber magnets 41 to 44 are embedded in the belt 1. The rubber magnets 41 and 42 are embedded close to the widthwise side end of the belt 1 apart from each other in the proceeding direction (longitudinal direction) of the belt 1 at a predetermined distance L. The rubber magnets 43 and 44 are embedded at positions, which are still far away from the rubber magnets 41 and 42 at a predetermined distance longer than the distance L, similarly with the rubber magnets 41 and 42, close to the side end of the belt 1 apart from each other in the proceeding direction of the belt 1 at the predetermined distance L.

FIG. 1 schematically shows the monitoring system of the conveyor belt. For example, in a conveyor belt in which the distance between the head pulley 21 and the tail pulley 22 is several km, rubber magnets are arranged two by two at intervals of 100 m, like the rubber magnets 41 and 42. As described above, the rubber magnets are disposed substantially in the same interval, and extension of the belt 1 at each position can be measured throughout the whole length of the belt 1. Particularly, bonding portions 11 of the belt 1 are the parts where a steel cord as an internal reinforcement material of the belt 1 is discontinuous, and keeps longitudinal strength by bonding of rubber. Accordingly, there is greater potential for extension than in the other parts. Thus, it is preferable to dispose each pair of rubber magnets so that the bonding portion 11 is interposed between the rubber magnet 41 and the rubber magnet 42, and the bonding portion 11 is interposed between the rubber magnet 43 and the rubber magnet 44.

The rubber magnets 41 to 44 may be formed of a matrix consisting of at least one kind of rubber component selected from the group consisting of butyl rubber and silicon rubber, and a magnetic anisotropic magnetic element powder dispersed in the matrix, for example, a magnetic element powder formed of a rare-earth alloy. Here, as a rare-earth magnetic element, there are NdFeB, SmFeN, and the like.

Figure 15:
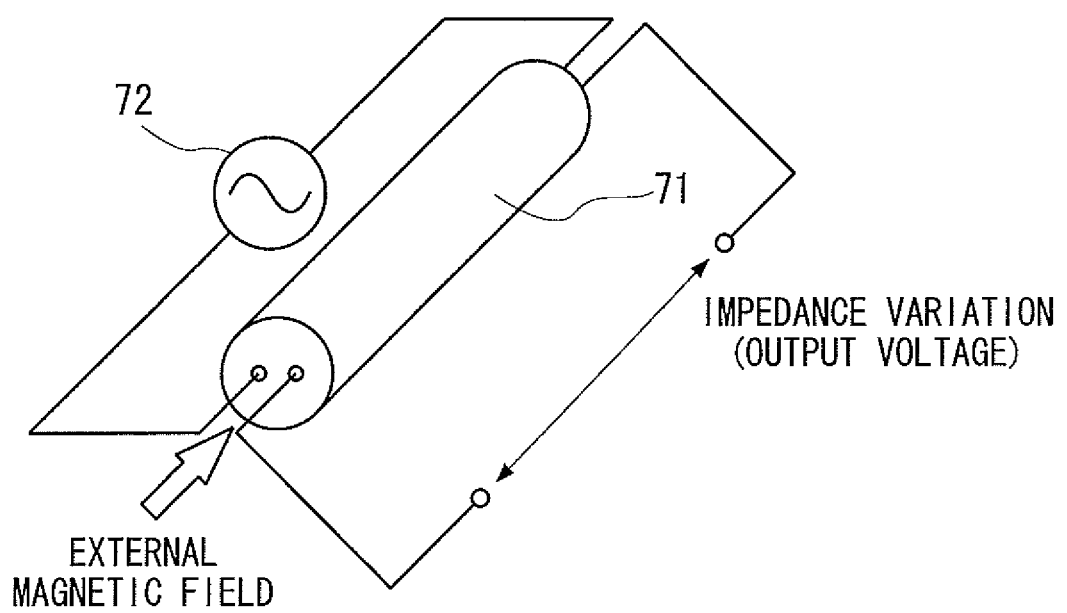
FIG. 15 is a schematic view for explaining an operation principle of an MI sensor.

Meanwhile, outside of the belt 1, a pair of MI sensors 51 and 52 is provided at positions opposed to the rubber magnets 41 to 44, away from the belt 1 at a predetermined distance. As described with reference to FIG. 15, the MI sensors 51 and 52 are the magnetic sensors measuring the magnitude of the external magnetic field using the MI effect caused by the amorphous wire. The MI sensors 51 and 52 are provided therein with, for example, an amorphous wire that is directed in a direction of detecting magnetic lines generated from the rubber magnets 41 to 44, a pulse oscillation circuit that allows an electric current to flow into the amorphous wire, a pickup coil wound on the amorphous wire, and a signal processing circuit that amplifies an induction voltage generated in the pickup coil. The MI sensors 51 and 52 output direct-current voltages proportional to the external magnetic field. The signal processing circuit includes a Peak Hold Circuit that holds peak values of the induction voltage generated in the pickup coil, a differential amplification circuit that amplifies the picked and held voltage, and the like. For example, the signal processing circuit outputs a direct-current voltage of 1 to 4 V (1 V at −3 gauss and 4 V at 3 gauss) with respect to a gauss magnetic flux density of ±3 gauss by supplying a direct-current power supply voltage of 5 V. When the external magnetic field is 0, a half power supply voltage, that is, a direct-current voltage of 2.5 V±0.1 V (2.4 to 2.6 V) is output.

FIG. 1 shows the case of providing two MI sensors, but MI sensors may be plurally provided according to the length or the like of the belt 1. The internal configuration, the output characteristics, and the like of the MI sensors may be appropriately selected according to specifications of the belt 1, and are not limited to the above description.

The MI sensors 51 and 52 are connected to a signal processing device 62. The signal processing device 62 supplies the power supply voltage to the MI sensors 51 and 52, the output signals of the MI sensors are input to the signal processing device 62, and the signal processing device 62 performs a signal process such as analog-digital conversion and outputs the signals to a personal computer 61 (hereinafter, referred to as PC 61). The PC 61 is a general purpose note-type personal computer and executes a program for the embodiment on a predetermined OS (operating system), thereby acquiring signals representing detection values (output values) of the MI sensors 51 and 52 transmitted from the signal processing device 62, and determining the condition of the belt 1 on the basis of the detection values.

Figure 2:
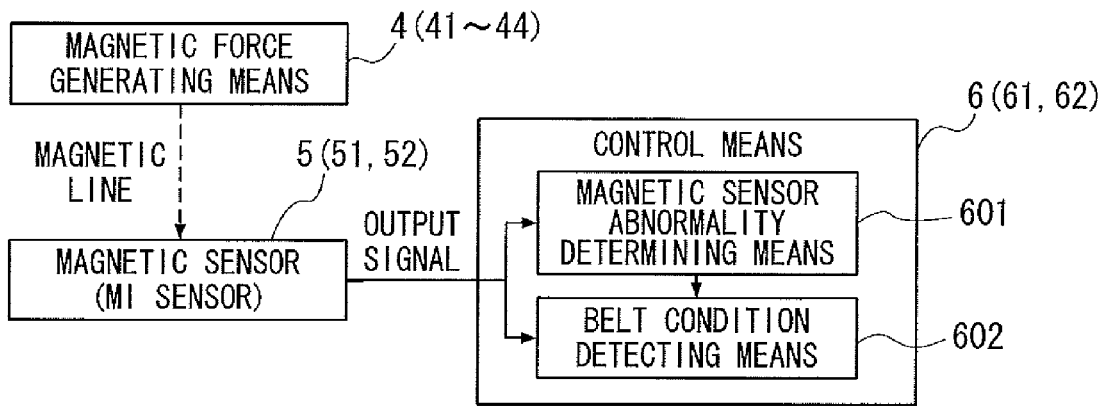
FIG. 2 is a block diagram for explaining functions of configurations of the embodiment shown in FIG. 1.
Figure 3:
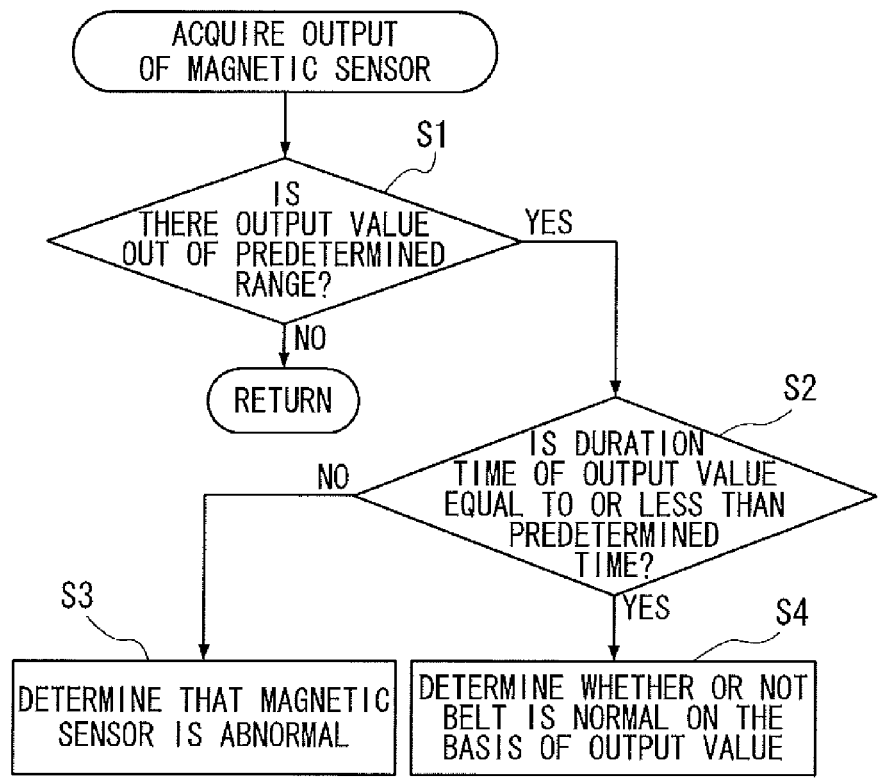
FIG. 3 is a flowchart illustrating a process flow in a PC 61 shown in FIG. 1.

Next, an operation of the embodiment shown in FIG. 1 will be described with reference to FIG. 2 and FIG. 3. FIG. 2 is a block diagram illustrating functional blocks of the system shown in FIG. 1, and the same reference numerals are given to the configurations corresponding to the configurations shown in FIG. 1. FIG. 3 is a flow chart illustrating a process flow in the PC 61.

As shown in FIG. 2, the embodiment can be functionally divided into a magnetic force generating means 4 that is provided in the belt 1, a magnetic sensor 5 that is provided outside of the belt 1 and detects the magnetic force generated by the magnetic force generating means 4, and a control means 6 that detects the condition of the belt 1 on the basis of the detection result of the magnetic sensor 5. The magnetic force generating means 4 corresponds to the rubber magnets 41 to 44, and the magnetic sensor 5 corresponds to the MI sensors 51 and 52. The control means 6 corresponds to the combination of the PC 61 and the signal processing device 62.

The control means 6 can be divided into magnetic sensor abnormality determining means 601 that determines whether or not the magnetic sensor 5 is abnormal on the basis of the output signals of the magnetic sensor 5 (MI sensors 51 and 52), and belt condition detecting means 602 that performs a process for detecting the condition of the belt on the basis of the output signal of the magnetic sensor 5. The magnetic sensor abnormality determining means 601 and the belt condition detecting means 602 are realized by a program executed on the PC 61.

Next, the process flow of the PC 61 will be described with reference to FIG. 3. The PC 61 calls and performs a process of Step S1 and the later, whenever the PC 61 acquires the outputs of the MI sensors 51 and 52 at a predetermined period through the signal processing device 62. In Step S1, it is determined whether or not the output values are within a predetermined range. The case where the output values of the MI sensors 51 and 52 are "output values outside the predetermined range" is a case where a predetermined level or higher magnetic force, that is, a magnetic force generated by the magnetic force generating means 4 is detected, or a case where the outputs of the MI sensors 51 and 52 are abnormal. Accordingly, in Step S2 and later, a process such as a determination thereof or the like is performed. Meanwhile, when there are no output values which are out of the predetermined range, it returns from this process, and the process of acquiring the outputs of the MI sensors 51 and 52 at the predetermined period is performed.

In the embodiment, it is assumed that the MI sensors 51 and 52 are set to output 2.5 V when the external magnetic field is 0, and to output 1 to 4 V when the external magnetic field is ±3 gauss. In this case, for example, when magnetism of ±0.5 gauss is detected, the outputs of the MI sensors 51 and 52 are 2.0 to 3.0 V. However, the case where the external magnetic field is up to 0.5 gauss is considered as in an erroneous range, and 2.0 to 3.0 V are the outputs of the MI sensors 51 and 52 considered as "output values within the predetermined range".

In Step S1, when it is determined that the output values are within the range of 2.0 to 3.0 V, the magnetic force generated by the magnetic force generating means 4 is not detected. Accordingly, returning to the process of calling the process routine shown in FIG. 3, the process of acquiring the outputs of the MI sensors 51 and 52 is performed again. Meanwhile, when it is determined that there are output values out of the range, the determination whether the magnetic force generated by the magnetic force generating means 4 is detected or the outputs of the MI sensors 51 and 52 are abnormal and the process corresponding to the determination result are performed in Step S2 and the later.

In Step S2, it is determined whether or not a duration time when the output values of the MI sensors 51 and 52 is out of the predetermined range is equal to or less than a "predetermined time". The "predetermined time" is set according to the time when the magnetic forces generated by the rubber magnets 41 to 44 shown in FIG. 1 are detected by the MI sensors 51 and 52 in the course of movement. That is, when the duration time is equal to or less than the "predetermined time", it is represented that the output values of the MI sensors 51 and 52 vary within a regular time. Accordingly, it can be determined that strength or weakness (existence or non-existence) of the magnetic force according to the movement of the rubber magnets 41 to 44 is normally detected. However, when the duration time is longer than the "predetermined time" occurs (e.g., because the output values are regular such as 0 V, or the output values are regular such as 5 V), it can be determined that the output values of the MI sensors 51 and 52 are not normally varied according to the positions of the rubber magnets 41 to 44, and the MI sensors 51 and 52 are in the abnormal state.

In Step S2, when it is determined that the duration time when the output values of the MI sensors 51 and 52 are out of the predetermined range is not equal to or less than the "predetermined time", the process at the time of determining that the MI sensors 51 and 52 (magnetic sensor 5) are abnormal is performed (Step S3). Meanwhile, when it is determined that the duration time is equal to or less than the "predetermined time", the output values are considered as normal and a belt normality determining process, that is, the condition of the belt detecting process is performed on the basis of the output values of the MI sensors 51 and 52 (Step S4).

In Step S3, for example, information, which represents that the MI sensors 51 and 52 are abnormal or the output of any MI sensor is abnormal, is displayed on the screen of the PC 61. In Step S4, the movement speed of the belt 1, and the interval of time when the MI sensors 51 and 52 detect the magnetic forces generated by the rubber magnets 41 and 42 (or the rubber magnets 43 and 44) are calculated to calculate the distance between the rubber magnets 41 and 42 (or the rubber magnets 43 and 44) and to calculate the value of extension (specifically, extension of the bonding portion 11) of the belt 1 from the variation of the value with the lapse of time. When the extension of the belt is within a predetermined base value, it is determined as normal. Otherwise, it is determined as abnormal. Then, the determination result is displayed on the screen of the PC 61.

According to the embodiment, since the magnetic sensors are configured using the MI sensors 51 and 52 (magnetic sensors based on the MI effect), it is possible to obtain stable performance with low cost, as compared with the case where the magnetic sensors are configured by the Hall elements or the loop coils. Since the MI sensor has high sensitivity of detection, the rubber magnets 41 to 44 with relatively small magnetic forces can be used and the limit of magnetic force and size of the magnetic force generating means is small. Accordingly, the degree of freedom in selecting the magnetic force generating means is increased and the degree of freedom in layout is also increased. Therefore, the degree of freedom in the whole system is improved. Specifically, for example, square-shaped rubber magnets having one side of 10 mm or less may be used. In addition, for example, rubber magnets with magnetic forces of 1 gauss to 0.5 gauss may be used. In the case of using magnets with a size of 10 mm or less, it is possible to drastically improve the bending durability of the belt as compared with the case of using magnets with a size over 10 mm.

When the ground level of the magnetic sensor (output voltage when the external magnetic field is small) is not set to 0 V and the output of the magnetic sensor is continuously 0 V, it is possible to determine that the sensor is abnormal within a short time. Accordingly, the system can promptly determine abnormalities in the sensor, and troubleshooting is rapidly performed.

In the embodiment, the magnetic force generating means 4 is configured by the rubber magnets 41 to 44, but the magnetic force generating means 4 may be configured by embedding magnets formed of magnetic steel or the like in the belt 1 or attaching them onto the surface thereof. The connection between the PC 61 and the signal processing device 62 is not limited to wire connection, and they may be connected by wireless communication.

Figure 4:
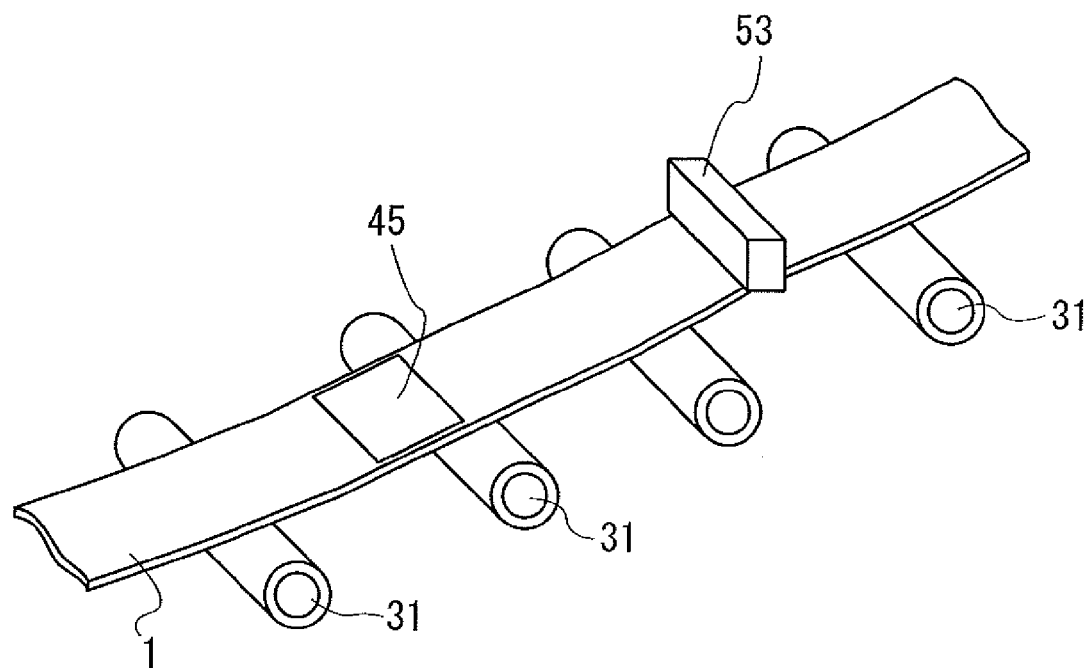
FIG. 4 is a schematic view illustrating an appearance of a monitoring system of a conveyor belt according to another embodiment of the present invention.
Figure 5:
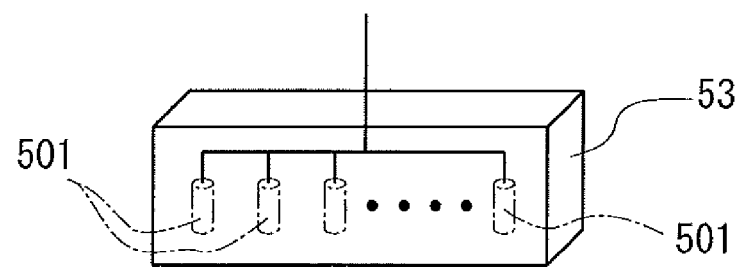
FIG. 5 is a schematic view illustrating an inner configuration of an MI sensor 53 shown in FIG. 4.

Next, another embodiment of the invention will be described with reference to FIG. 4 and FIG. 5. Hereinafter, only characteristic parts different from the embodiment shown in FIG. 1 will be described, and the other descriptions will be omitted. FIG. 4 shows that a rubber magnet 45 is provided on the belt 1 instead of (or in addition to) the rubber magnets 41 to 44 in the embodiment shown in FIG. 1, and an MI sensor 53 is provided instead of (or in addition to) the MI sensors 51 and 52. In FIG. 4, the same reference numerals are used for the same configurations as the configurations shown in FIG. 1. It is considered that the MI sensor 53 shown in FIG. 4 is connected to the PC 61 shown in FIG. 1 through the same signal processing device as the signal processing device 62.

The rubber magnet 45 is a rubber magnet formed in the same manner as the rubber magnets 41 to 44, but has a different shape and is attached to the surface of the belt 1 so as to have a regular thickness. As shown in FIG. 5, the MI sensor 53 is configured so that a plurality of the same MI sensors 501 as the MI sensor 51 or 52 is installed in one case to be arranged in the widthwise direction of the belt 1. The MI sensors 501 have the same direction for detecting the external magnetic field and are arranged in a line with regular intervals. A direct-current power is supplied from the same signal processing device (not shown) as the signal processing device 62 to each of the MI sensors 501 through a common power supply line, and independent signal output lines are connected thereto. Accordingly, the PC 61 can individually acquire the output signals of the MI sensors 501.

In the embodiment shown in FIG. 4, the PC 61 compares and analyzes the output signal of the MI sensors 501 provided in the MI sensor 53, thereby confirming variation (bias) of the magnetic force generated by the rubber magnet 45 in the widthwise direction of the belt 1. As a result, it is possible to determine normality of the belt 1. When the outputs of the MI sensors 501 vary or the variation in the output of the specific MI sensor 501 with the lapse of time is different from the variation of the output of another MI sensor 501, it is possible to detect that variation such as one-sided abrasion occurs in the belt 1.

Next, still another embodiment will be described with reference to FIG. 6. In the embodiment, rubber magnets 46 and 47 are provided instead of (or in addition to) the rubber magnet 45 shown in FIG. 4. The rubber magnets 46 and 47 are rubber magnets formed in the same manner as the rubber magnets 41 to 44 shown in FIG. 1, but are arranged and embedded to be separated into two parts in the widthwise direction of the belt 1. Although FIG. 6 shows the case where the rubber magnets are separated into two parts, they may be separated into three or more parts.

Figure 6:
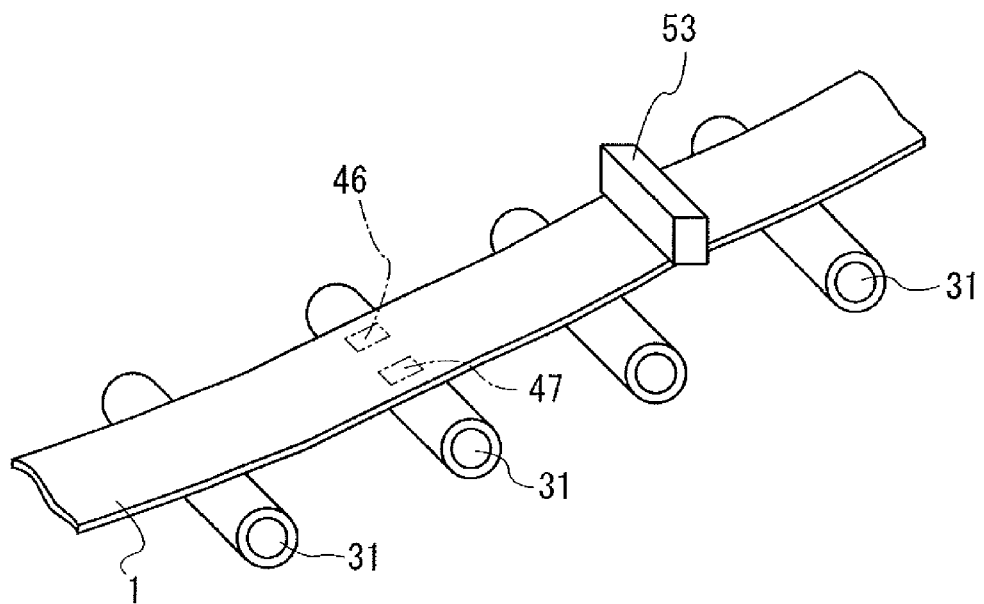
FIG. 6 is a schematic view illustrating an appearance of a monitoring system of a conveyor belt according to still another embodiment of the present invention.

In the embodiment shown in FIG. 6, the PC 61 compares and analyzes the output signals of the MI sensors 501 provided in the MI sensor 53, thereby confirming the variation in the magnetic forces generated by the rubber magnets 46 and 47 in the widthwise direction of the belt 1. As a result, it is possible to determine normality of the belt 1. When the variation of the outputs of the MI sensors 501 with the lapse of time represents the variation such as the case where the interval between the rubber magnets 46 and 47 is expanded (e.g., representing that an interval between positions corresponding to two peak values in the distribution of magnetic flux density in the widthwise direction of the belt 1 obtained from the outputs of the MI sensors 501 is expanded), it is possible to detect that longitudinal expansion occurs in the belt 1. From this, it is possible to predict in advance that a longitudinal split of the belt 1 may occur.

Next, still another embodiment will be described with reference to FIG. 7. In the embodiment, instead of the rubber magnet 45 shown in FIG. 4, a stair portion 48 where a plurality of flat plate rubber magnets is provided in a stair shape from a core element 1a of the belt 1, and a slope portion 49 that is provided to be inclined from a position of the rubber magnet provided at a position closest to the surface of the belt 1 in the stair portion 48 toward the surface of the belt in the arrangement direction of the rubber magnets are provided.

The stair portion 48 is provided with a plurality of flat plate rubber magnets 48a, 48b, and 48c embedded in the belt 1 to extend in the widthwise direction of the belt 1. The rubber magnet 48a is provided along the core element 1a formed of a steel belt, sailcloth, or the like extending throughout the whole periphery of the belt 1 at an intermediate portion of the belt 1 in the thickness direction.

The rubber magnets 48b and 48c are provided parallel to each other and parallel to the surface of the belt 1 at a predetermined interval in the surface direction of the belt 1 from a base point that is the position of the rubber magnet 48a, and the rubber magnets 48a, 48b, and 48c form a stair shape. The rubber magnet 48c in the embodiment is embedded in the belt 1 in a positional relation so as not to be exposed to the surface of the belt 1.

Meanwhile, the slope portion 49 is formed of a flat plate rubber magnet 49a embedded in the belt 1 to extend in the widthwise direction of the belt 1. In the embodiment, the rubber magnet 49a is provided to be inclined at a predetermined angle in the longitudinal direction of the belt 1 so that one end is adjacent to the position where the rubber magnet 48C is embedded and the other end is exposed to the surface of the belt 1.

Hereinafter, an operation of the monitoring system of the conveyor belt according to the embodiment will be described with reference to FIG. 7 to FIG. 10. First, magnetic force variation of the stair portion 48 in the embodiment will be described. FIG. 8 is a schematic graph illustrating magnetic force variation when the magnetic forces generated from the rubber magnets 48a, 48b, and 48c in the stair portion 48 are recorded with the lapse of time at a position of the MI sensor 501 provided in the MI sensor 53. The vertical axis denotes magnetic force, and the horizontal axis denotes elapsed time.

A curve represented by the sign G1 shows magnetic force variation in the state where the rubber magnets 48a, 48b, and 48c in the stair portion 48 are not exposed to the belt surface. When the stair portion 48 is not within the detection range of the MI sensor 501, the magnetic force generated from the belt is 0. Accordingly, an "output value within a predetermined range" is output from the MI sensor 501. When the stair portion 48 gets close to the detection range of the MI sensor 501 (time T0) as the belt 1 proceeds, the magnetic force at the position of the MI sensor 501 increases. Subsequently, in the MI sensor 501, the output value over the "output value within a predetermined range" is transmitted to the PC 61.

The output value of the MI sensor 501 is varied corresponding to variation in the magnetic force represented by the curve G1. When the stair portion 48 passes through the detection range of the MI sensor 501 (time T1), the magnetic force becomes 0. Accordingly, the "output value within a predetermined range" is output again from the MI sensor 501.

Figure 7:
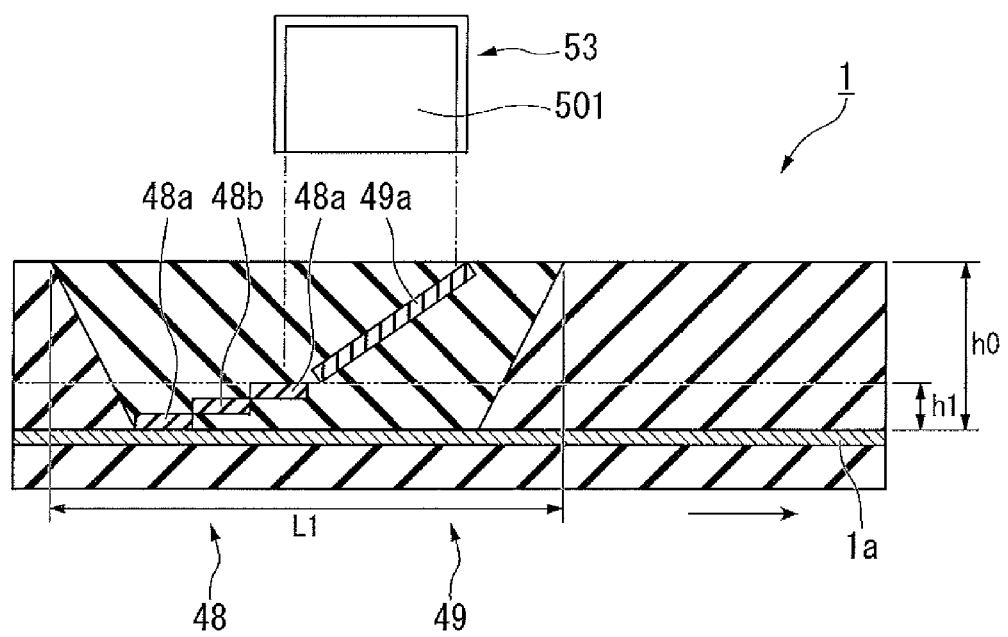
FIG. 7 is a schematic view illustrating a monitoring system of a conveyor belt according to still another embodiment of the present invention.
Figure 8:
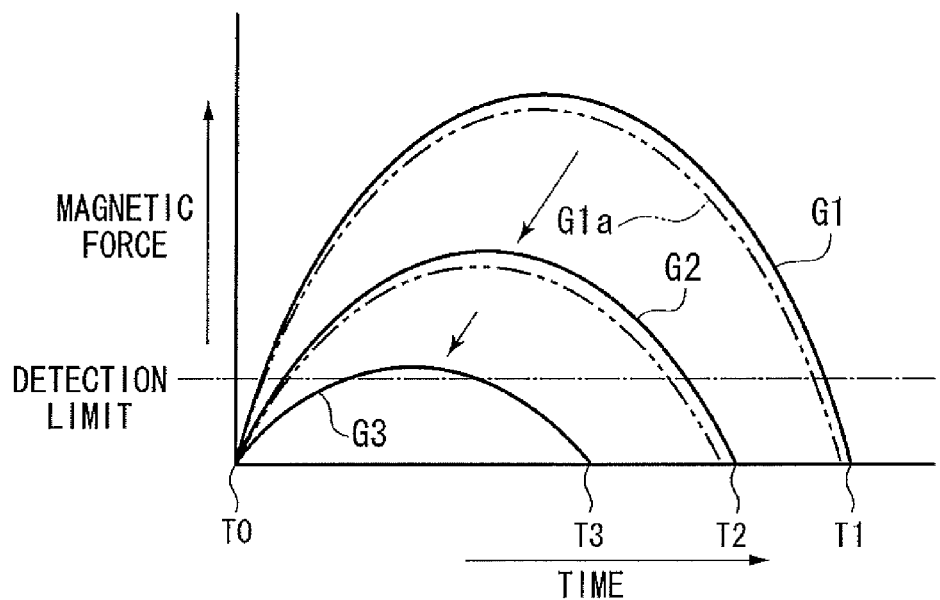
FIG. 8 is a diagram for explaining magnetic force variation in a stair portion.

As the surface of the belt 1 is worn away, the rubber magnet 48c on the top of the stair portion 48 is first exposed to the surface of the belt and is gradually scraped away (see FIG. 7). As the rubber magnet 48c is worn away, the magnetic force of the rubber magnet 48c decreases. However, the existence of the rubber magnet 48c is detected by the MI sensor 501. The curve G1a represents the magnetic force variation immediately before the rubber magnet 48c is completely scraped away.

When the rubber magnet 48c is completely scraped away, the rubber magnet 48b is exposed to the surface of the belt 1. At this time, the magnetic force when the stair portion 48 passes by the position of the MI sensor 501 is varied as shown by the curve G2, and the elapsed time is shortened by the loss of the rubber magnet 48c to be the time T2.

Similarly, the rubber magnet 48b is scraped away, the rubber magnet 48a is exposed to the belt surface, and the magnetic force is varied as shown by the curve G3. When the rubber magnet 48a is completely scraped away, the magnetic force from the stair portion 48 completely disappears.

Figure 9:
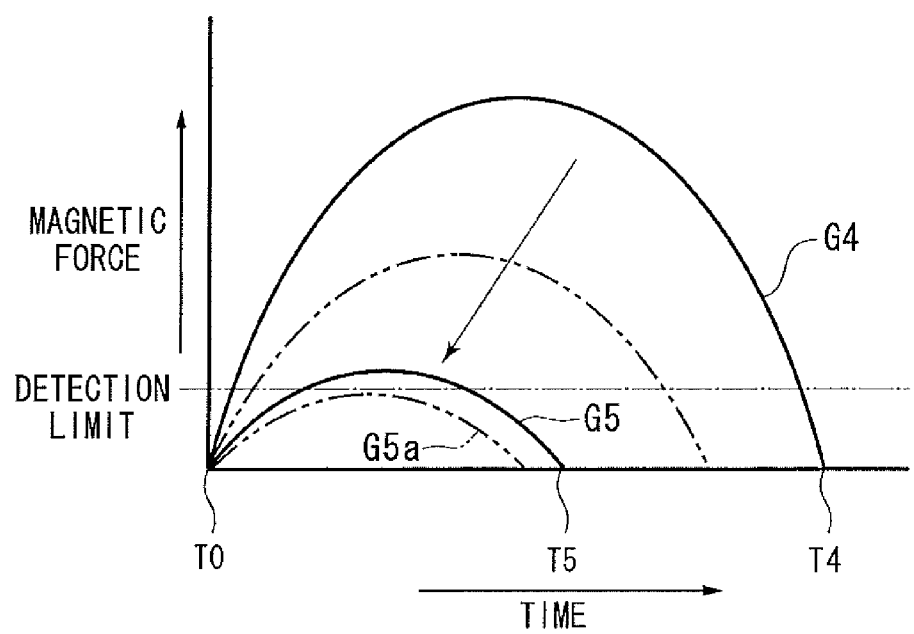
FIG. 9 is a diagram for explaining magnetic force variation in a slope portion.

Hereinafter, magnetic force variation of the slope portion 49 in the embodiment will be individually described. FIG. 9 is a schematic graph illustrating magnetic force variation when the magnetic force generated from the rubber magnet 49a in the slope portion is recorded with the lapse of time at the position of the MI sensor 501. The vertical axis denotes the magnetic force, and the horizontal axis denotes the elapsed time.

A curve represented by the sign G4 shows magnetic force variation in a new product state where the rubber magnet 49a is not scraped away at all in the slope portion 49. When the slope portion 49 is not within the detection range of the MI sensor 501, the magnetic force generated from the belt is 0. Accordingly, the "output value in a predetermined range" is output from the MI sensor.

When the slope portion 49 gets close to the detection range of the MI sensor 501 (time T0) as the belt 1 proceeds, the magnetic force at the position of the MI sensor 501 increases. Subsequently, in the MI sensor 501, the output value over the "output value within a predetermined range" is transmitted to the PC 61.

The output value of the MI sensor 501 is varied corresponding to variation in the magnetic force represented by the curve G4. When the slope portion 49 passes through the detection range of the MI sensor 501 (time T4), the magnetic force becomes 0. Accordingly, the "output value within a predetermined range" is output again from the MI sensor 501.

In the slope portion 49, as the surface of the belt 1 is worn away, the rubber magnet 49a is gradually scraped away from the surface of the belt 1. That is, the length of the rubber magnet 49a in the longitudinal direction of the belt is continuously shortened. For this reason, the variation in the magnetic force from the slope portion 49 at the position of the MI sensor 501 is continuously varied from the variation shown by the curve G4 to the variation shown by the curve G5.

In the magnetic force variation shown by the curve G5, a magnetic force stronger than the detection limit is generated, and thus it is possible to detect the existence of the rubber magnet 49a by the MI sensor 501. When the belt 1 is further worn away, the magnetic force is lower than the detection limit (see the curve G5a). Accordingly, even when the rubber magnet 49a remains, the magnetic force cannot be detected. Therefore, at this time, the "output value within a predetermined range" is output in the MI sensor.

Figure 10:
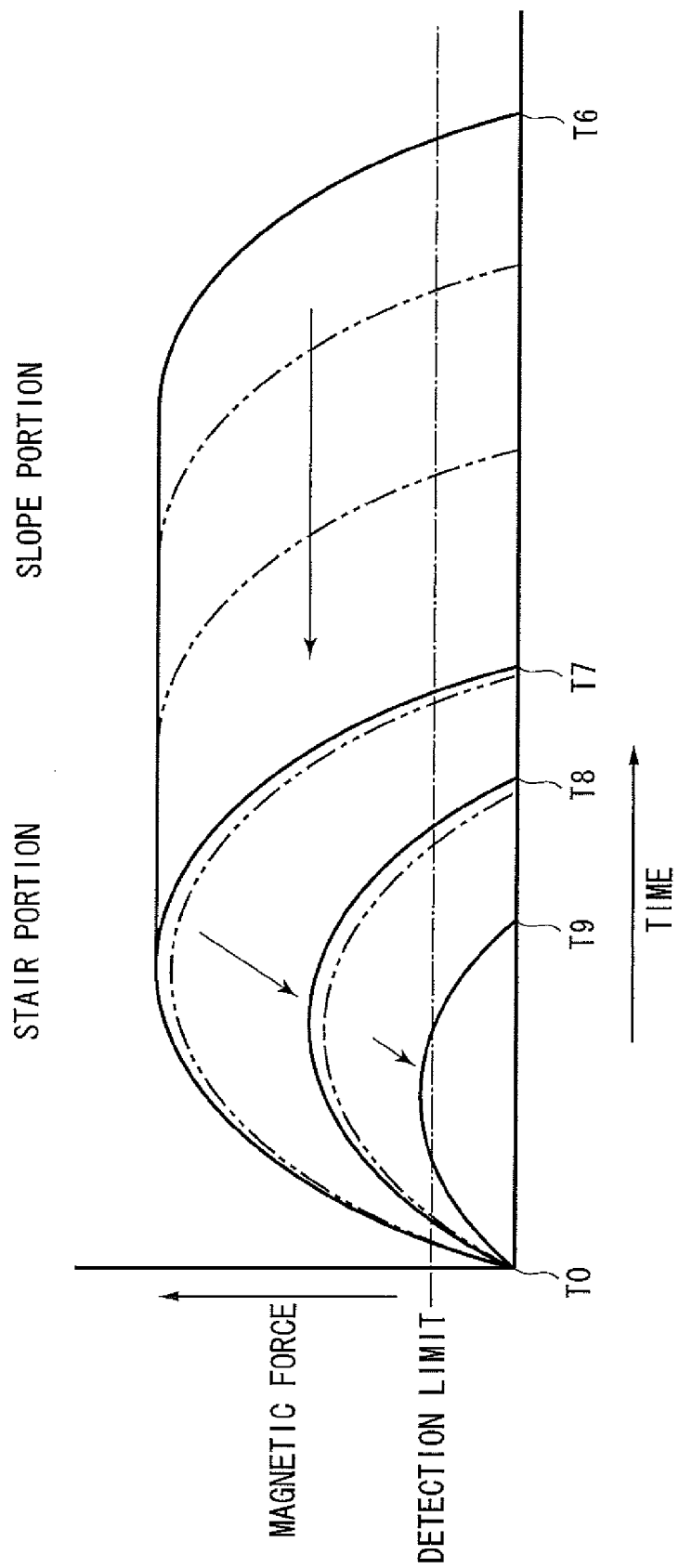
FIG. 10 is a diagram for explaining magnetic force variation in the embodiment shown in FIG. 7.

Hereinafter, magnetic force variation in the belt 1 provided with both the stair portion 48 and the slope portion 49 in the embodiment will be described with reference to FIG. 7 and FIG. 10.

In the embodiment, the PC 61 compares and analyzes the output signals of the MI sensors 501 provided in the MI sensor 53 in the same manner as the other embodiments. Accordingly, variation in the magnetic forces generated by the rubber magnets 48a, 48b, 48c, and 49a of the stair portion 48 and the slope portion 49 is confirmed.

As shown in FIG. 7, while the belt 1 is worn away so that the thickness from the core element 1a to the surface of the belt 1 is changed from an initial thickness h0 to a thickness h1, none of the rubber magnets 48a, 48b, and 48c of the stair portion 48 are scraped away and the slope portion 49 is first scraped away.

When the rubber magnet 49a of the slope portion 49 is gradually scraped away from the surface of the belt 1, the length of the rubber magnet 49a in the longitudinal direction of the belt 1 is decreased and the elapsed time when the magnetic force is being generated at the position of the MI sensor 501 is continuously reduced from T6 toward T7.

When the belt 1 is worn away, the rubber magnet 49a of the slope portion 49 is completely scraped away and the rubber magnet 48c provided closest to the surface of the belt 1 among the rubber magnets 48a, 48b, and 48c in the stair portion 48 is exposed to the surface of the belt 1. At this time, in the MI sensor 501, only the magnetic force of the stair portion 48 is detected, and the elapsed time becomes T7.

When the surface of the belt 1 is worn away, the stair portion 48 is scraped away stepwise in order of the rubber magnets 48c, 48b, and 48a as described above. The elapsed time is reduced stepwise from T7 through T8 to T9.

When only the magnetic force of the rubber magnet 48a is detected by the MI sensor 501, the PC 61 determines that the belt 1 is worn away to the vicinity of the core element 1a, and performs an operation to prompt checking and replacement of the belt 1.

As described above, in the embodiment, the flat plate rubber magnets are embedded in the stair portion 48 with a predetermined depth and a predetermined width in the longitudinal direction of the belt 1. Accordingly, the output time of the MI sensor 53 is digitally varied, and thus precision in detection of the abrasion state of the belt 1 at the last stage of abrasion is improved. In the slope portion 49, one rubber magnet is provided to be inclined from the surface of the belt 1 to the intermediate portion in the thickness direction of the belt 1, and thus the output time of the MI sensor 53 (MI sensor 501) is continuously varied corresponding to the abrasion state of the belt 1.

In the stair portion 48 and the slope portion 49, the rubber magnets 48a, 48b, 48c, and 49a are provided to extend in the widthwise direction of the belt 1. Accordingly, in the embodiment, it is possible to also detect one-sided abrasion of the belt 1.

In addition, a high-directivity MI sensor is used, and the magnetic force is measured in a relatively narrow range as compared with, for example, a case where a low-directivity loop coil type magnetic MI sensor is employed. Accordingly, it is possible to detect variation in the magnetic force at a relatively short distance with high sensitivity. Therefore, it is possible to shorten the lengths of the stair portion 48 and the slope portion 49 in the longitudinal direction of the belt 1. Accordingly, the necessary length L1 for embedding the magnetic force generating means in the belt 1 is shortened (e.g., about 400 mm in the embodiment). As a result, the number of rubber magnets embedded in the belt 1 can be reduced, and the number of production processes of embedding the rubber magnets and the working time can be reduced.

Moreover, when the magnetic force generating means is embedded in the belt 1, the belt 1 is peeled off from the surface of the belt 1 at the position for embedding the magnetic force generating means into the core element 1a, a rubber component or the like as a raw material of the belt 1 is filled while disposing the magnetic force generating means, and it is vulcanized by applying heat or pressure by a vulcanizer or the like. In this case, when the peeled-off area is wide, the number of production processes or the number of vulcanizers necessary for the vulcanization is increased.

Figure 14:
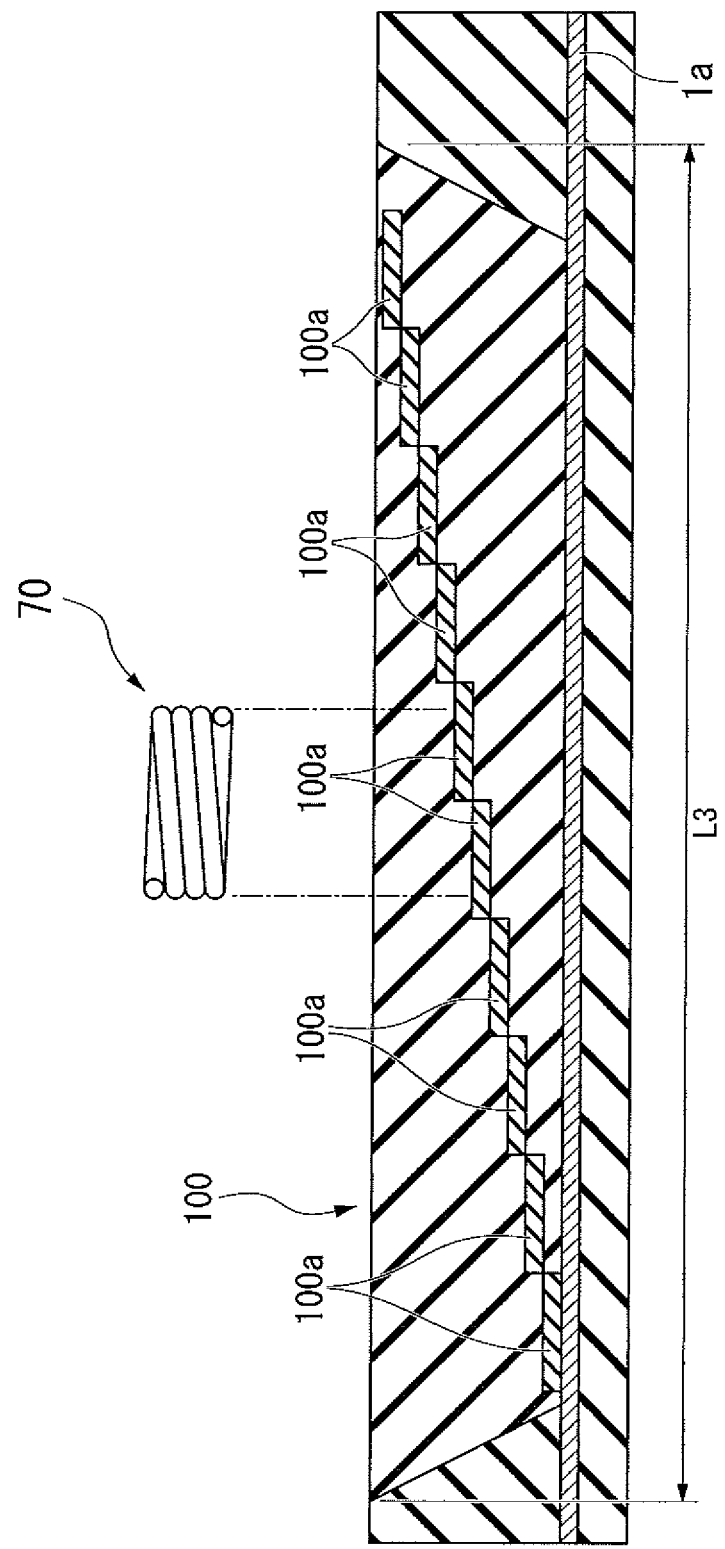
FIG. 14 is a longitudinal cross-sectional view of a belt for explaining a general configuration of a part of magnetic force generating means of a known monitoring system of a conveyor belt using a loop coil.

For example, as shown in FIG. 14, in the monitoring system employing the known loop coil type magnetic sensor, in order to detect variation in the magnetic force according to abrasion of the belt 1, it is general practice to provide a loop coil 70 provided separately from the belt 1 instead of the MI sensor 501, and a stair portion 100 in which a plurality of rubber magnets 100a having a length relatively longer than that of the rubber magnets 48a, 48b, and 48c in the longitudinal direction of the belt 1 are provided in a stair shape corresponding to resolution of the loop coil 70.

In such a known monitoring system, the length L3 of peeling off the surface of the belt 1 for embedding the magnets is long (generally 2,000 mm or more). Accordingly, the number of production processes or the number of vulcanizers in the processes of the filling and vulcanization of the rubber component performed after disposing the rubber magnets 100a is increased. Therefore, the number of production processes and amount of time are necessary to form the plurality of embedding parts on one belt.

Next, still another embodiment will be described with reference to FIG. 11. In the embodiment, a slope portion 50 disposed to extend and be embedded in the widthwise direction of the belt 1 is provided adjacent to the stair portion 48 on the opposite side to the proceeding direction of the belt 1, instead of the slope portion 49 shown in FIG. 7. The slope portion 50 is formed of a rubber magnet 50a as a flat plate magnet provided so that one end comes into contact with the core element 1a and the other end is exposed to the surface of the belt 1.

Hereinafter, magnetic force variation of the belt 1 provided with both the stair portion 48 and the slope portion 50 according to the embodiment will be described with reference to FIG. 11 to FIG. 13.

Figure 12:
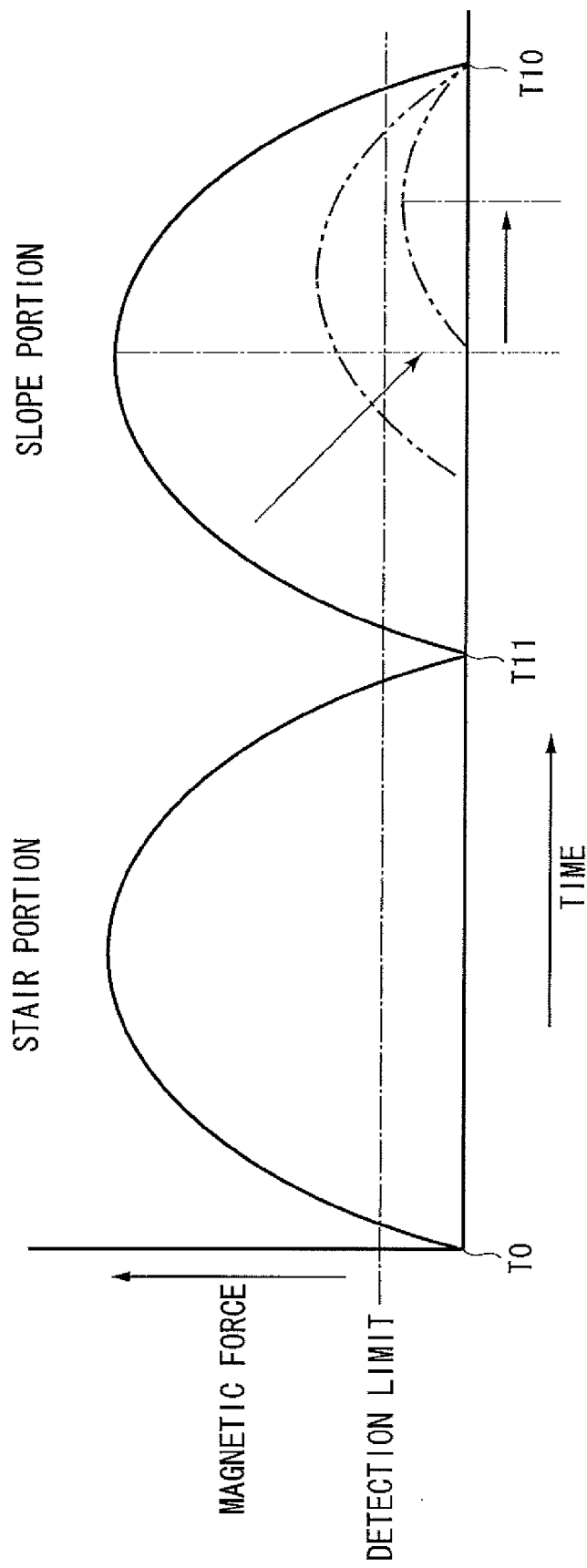
FIG. 12 is a diagram for explaining magnetic force variation in the embodiment shown in FIG. 11.

As shown in FIG. 12, in the belt 1 according to the embodiment, magnetic force variation occurs with two different peaks by the stair portion 48 and the slope portion 50. The period from the time T0 to the time T10 is a period when the stair portion 48 and the slope portion 49 pass by the MI sensor 501. Variation of the first half from the time T0 to the time T11 is derived from the magnetic force generated by the stair portion 48, and variation of the later half from the time T11 to the time T10 is derived from the magnetic force generated by the slope portion 50.

First, the slope portion 50 is scraped away from the surface of the belt 1 according to abrasion of the belt 1. Accordingly, the rubber magnet 50a is gradually shortened, and the magnetic force generated from the slope portion 50 is reduced (see dash-double-dot lines in FIG. 12). In the embodiment, the inclination direction of the slope portion 50 is the same direction as the arrangement direction of the rubber magnets 48a, 48b, and 48c of the stair portion 48, and the rubber magnet 50a is shortened in the direction from P0 to P1 shown in FIG. 11. Accordingly, the time when the magnetic force generated by the slope portion 50 is a peak continuously goes from the center between T11 and T10 toward T10.

Figure 11:
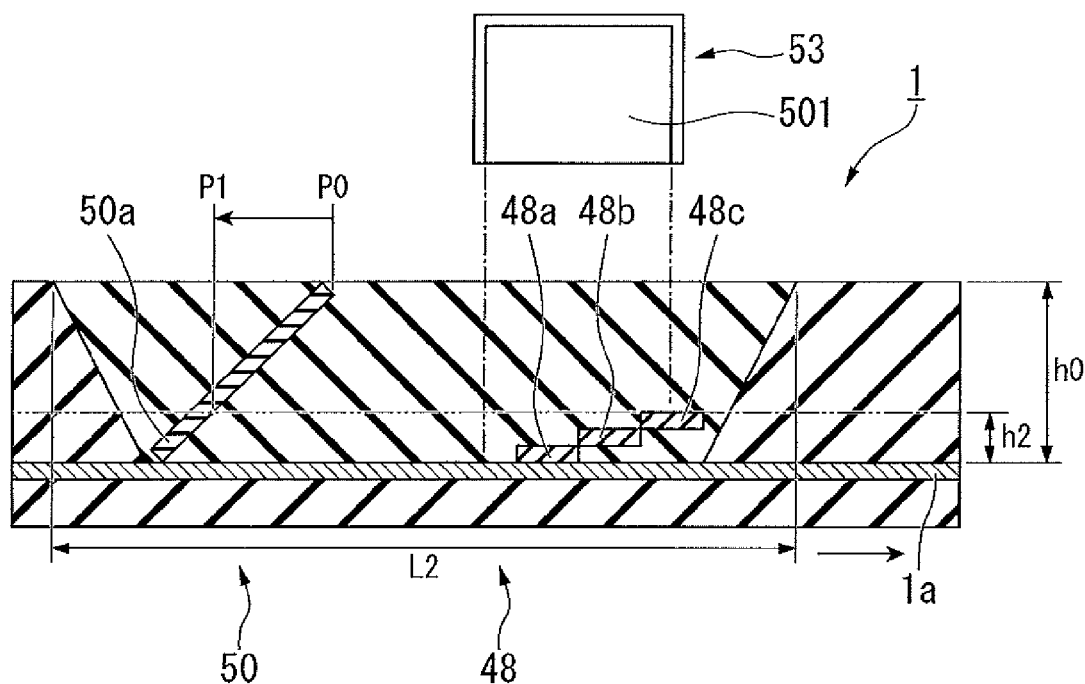
FIG. 11 is a schematic view illustrating a monitoring system of a conveyor belt according to still another embodiment of the present invention.

Subsequently, as shown in FIG. 11, when the belt 1 is worn away so that the thickness thereof becomes h2 from the core element 1a in the thickness direction, the rubber magnet 50a is worn away and shortened, and the rubber magnet 48c closest to the surface of the belt 1 of the stair portion 48 is exposed to the surface of the belt.

At this time, as shown in FIG. 12, the magnetic force in the stair portion 48 remains like the initial time. However, the magnetic force in the slope portion is reduced to the detection limit or less so that the magnetic force therefrom is not detected by the MI sensor 501.

Figure 13:
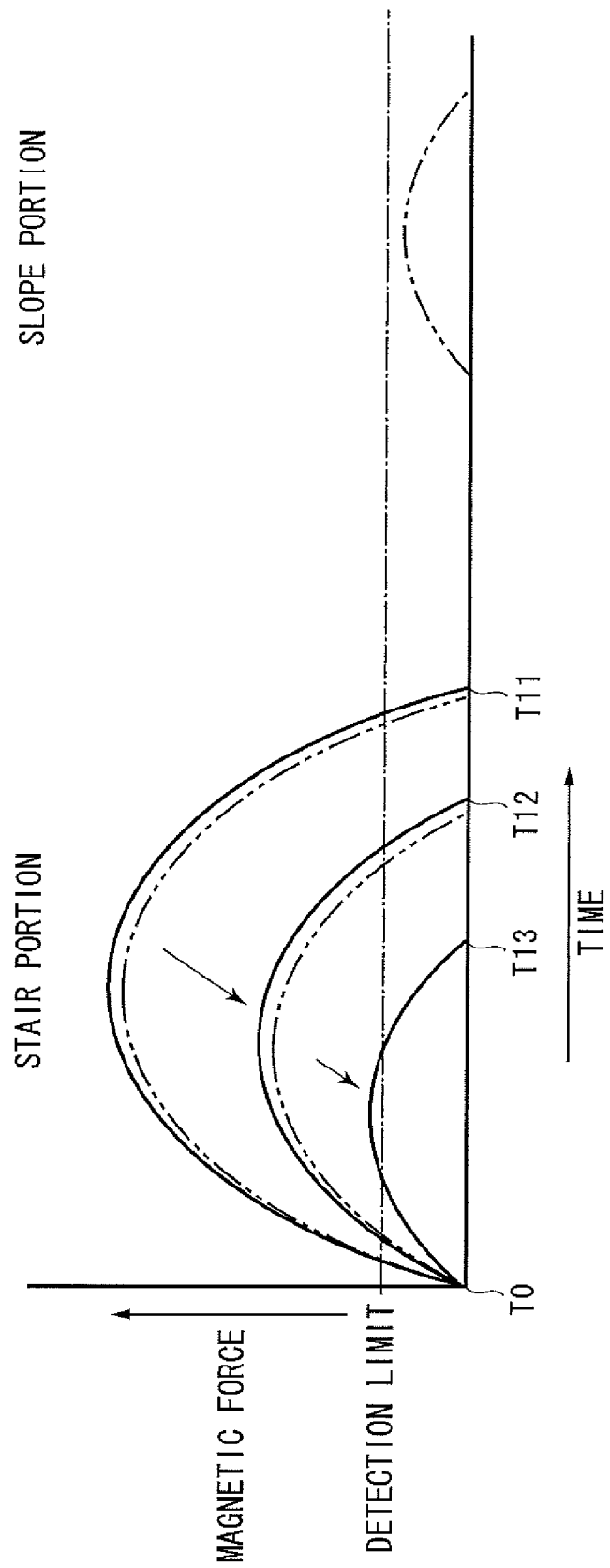
FIG. 13 is a diagram for explaining magnetic force variation in the embodiment shown in FIG. 11.

As the belt 1 is further worn away, as shown in FIG. 13, the rubber magnets 48c, 48b, and 48a are scraped away in this order in the stair portion 48 as described above, and the elapsed time is reduced in order of T11, T12, and T13. When only the magnetic force generated from the rubber magnet 48a is detected by the MI sensor 501, the PC 61 determines that the abrasion proceeds to the rubber magnet 48a, and performs an operation to prompt the checking and replacement of the belt 1.

As described above, even when the stair portion 48 and the slope portion 50 are embedded in the belt 1 and the magnetic forces generated by the stair portion 48 and the slope portion 50 are detected by the MI sensor 501, it is possible to detect the abrasion condition of the belt 1 with high precision.

In the embodiment, when the surface of the belt 1 is worn away so that the thickness from the core element 1a to the surface of the belt 1 is changed from the initial thickness h0 to the thickness h2 and the rubber magnet 48c is exposed to the surface of the belt 1, the position P1 of the end of the rubber magnet 50a close to the stair portion 48 is further away from the stair portion 48 than the position P0 before the abrasion (see FIG. 11). For this reason, turbulence in waveform caused by interference of the magnetic forces generated from the slope portion 50 and the stair portion 48 is reduced in the MI sensor 501, and thus complexity of analysis is reduced.

Also in the embodiment, the length L2 of the area for embedding the magnetic force generating means in the longitudinal direction of the belt 1 can be shortened (e.g., about 400 mm in the embodiment) like the embodiment shown in FIG. 7, and thus the number of production processes or the number of vulcanizers in the processes from the peeling-off to the vulcanization can be reduced.

As described above, in the embodiments of the present invention, MI sensors are used for the magnetic sensors, and thus it is possible to improve detection sensitivity as compared with the prior art. Accordingly, the limited elements (size, magnetic force, etc. of magnet) of the magnetic force generating means (transmission unit) embedded in (or attached to) the belt can be removed while decreasing the cost of the overall system. In addition, since the configuration of determining the sensor abnormalities on the basis of the duration time and output level of the magnetic sensor is employed, it is possible to reliably determine sensor abnormalities.

The embodiment of the present invention is not limited to the above description, for example, the configurations, the disposition, or the number of the magnetic force generating means 4, the magnetic sensor 5, the PC 61, the signal processing device 62, and the like may be appropriately modified such as increased. The installation of the magnetic force generating means 4 or the magnetic sensor 5 is not limited to the above description and, for example, it may be provided on the returning side of the belt 1 or on the opposite side (back side) to the conveying side of the belt 1.

In the embodiment of the present invention, the configuration of exposing the slope portion 49 to the surface of the belt 1 is employed, but the invention is not limited to the configuration of exposing it to the surface of the belt 1. For example, it may be embedded in the belt 1 so that the rubber magnet 49a is scraped away according to abrasion of the belt 1.

In the embodiment of the present invention, the configuration of disposing the stair portion 48 and the slope portion 49 on a straight line inclined toward the surface of the belt 1 as it goes in the proceeding direction of the belt 1 from the base point that is the position of the rubber magnet 48a disposed at a part of the core element 1a is employed, but the invention is not limited to this configuration. For example, a configuration of disposing them on a straight line inclined toward the surface of the belt 1 as it goes in a direction opposite to the proceeding direction of the belt 1 may be employed.

INDUSTRIAL APPLICABILITY

The present invention relates to a monitoring system of a conveyor belt including magnetic force generating means that is provided inside of a belt, and magnetic sensors that are provided outside of the belt, wherein a magnetic force generated by the magnetic force generating means is detected by the magnetic sensors to detect the condition of the belt, and wherein the magnetic sensors are configured using MI sensors. According to the invention, since the magnetic sensors are configured using the MI sensors (magnetic sensors based on the MI effect), it is possible to obtain stable performance at low cost, as compared with the case where the magnetic sensors are configured by Hall elements or loop coils. In addition, the limit on the magnetic force or size of the magnetic force generating means is reduced, and thus the degree of freedom in both selection of the magnetic force generating means and layout is also increased. Accordingly, the degree of freedom in the overall system is improved. In addition, since the magnetic sensors are configured using the MI sensors, it is possible to improve sensitivity in detection of the magnetic force and to improve precision in detection of the condition of the belt. Moreover, it is possible to shorten the length for embedding the magnetic force generating means in the belt, and thus the number of production processes and working hours from the peeling-off and vulcanization of the belt at the time of embedding the magnetic force generating means can be reduced.

The invention claimed is:
1. A monitoring system of a conveyor belt comprising:
a magnetic force generating means that is provided inside of a belt; and
a magnetic sensor that is provided outside of the belt,
wherein a magnetic force generated by the magnetic force generating means is detected by the magnetic sensor to detect a condition of the belt,
the magnetic sensor is configured using an MI sensor, and the monitoring system of the conveyor belt is provided with a determination means which determines that the magnetic sensor is in an abnormal state when a period of time when an output value of the magnetic sensor deviates from a predetermined range is longer than a predetermined period of time, the magnetic sensor is determined to be abnormal when a period of time, while the output voltage of the magnetic sensor is 0 V, exceeds a predetermined period of time.

2. The monitoring system of a conveyor belt according to claim 1, wherein the magnetic force generating means is attached to the belt so as to have a regular thickness,
wherein a plurality of the magnetic sensors is arranged in a widthwise direction of the belt, and
wherein the condition of the belt is detected on the basis of the values detected by the magnetic sensors.

3. The monitoring system of a conveyor belt according to claim 1, wherein the magnetic force generating means are separately arranged at least at two parts in the widthwise direction of the belt,
wherein a plurality of the magnetic sensors is arranged in the widthwise direction of the belt, and
wherein the condition of the belt is detected on the basis of the values detected by the magnetic sensors.

4. The monitoring system of a conveyor belt according to claim 1, wherein a plurality of the magnetic force generating means is provided in the longitudinal direction of the belt, and
wherein an interval of time when the magnetic sensor detects magnetic forces generated by the plurality of the magnetic force generating means is calculated to detect the condition of the belt.

5. The monitoring system of a conveyor belt according to claim 4, wherein the magnetic force generating means are embedded to extend in the widthwise direction of the belt.

6. The monitoring system of a conveyor belt according to claim 5, wherein the magnetic force generating means have flat plate magnets formed of an elastic material magnetized by containing particles of a magnetic element that generates a magnetic force.

7. A monitoring system of a conveyor belt comprising:
a magnetic force generating means that is provided inside of a belt; and
a magnetic sensor that is provided outside of the belt,
wherein a magnetic force generated by the magnetic force generating means is detected by the magnetic sensor to detect a condition of the belt,
the magnetic sensor is configured using an MI sensor, and
the monitoring system of the conveyor belt is provided with a determination means which determines that the magnetic sensor is in an abnormal state when a period of time when an output value of the magnetic sensor deviates from a predetermined range is longer than a predetermined period of time and the predetermined range is set within a range excluding 0V,
a plurality of the magnetic force generating means is provided in the longitudinal direction of the belt, and
an interval of time when the magnetic sensor detects magnetic forces generated by the plurality of the magnetic force generating means is calculated to detect the condition of the belt,
the magnetic force generating means are embedded to extend in the widthwise direction of the belt,
the magnetic force generating means have flat plate magnets formed of an elastic material magnetized by containing particles of a magnetic element that generates a magnetic force,
the magnetic force generating means is provided with a stair portion where a plurality of the flat plate magnets are provided in a stair shape in a depth direction of the belt from a core element of the belt to an intermediate portion between the core element and a surface of the belt, and a slope portion that is provided to be inclined from a position of the plate magnet closest to the surface of the belt in the stair portion toward the surface of the belt in an arrangement direction of the flat plate magnets.

8. A monitoring system of a conveyor belt comprising:
a magnetic force generating means that is provided inside of a belt; and
a magnetic sensor that is provided outside of the belt,
wherein a magnetic force generated by the magnetic force generating means is detected by the magnetic sensor to detect a condition of the belt,
the magnetic sensor is configured using an MI sensor, and
the monitoring system of the conveyor belt is provided with a determination means which determines that the magnetic sensor is in an abnormal state when a period of time when an output value of the magnetic sensor deviates from a predetermined range is longer than a predetermined period of time and the predetermined range is set within a range excluding 0V,
a plurality of the magnetic force generating means is provided in the longitudinal direction of the belt, and
an interval of time when the magnetic sensor detects magnetic forces generated by the plurality of the magnetic force generating means is calculated to detect the condition of the belt,
the magnetic force generating means are embedded to extend in the widthwise direction of the belt,
the magnetic force generating means have flat plate magnets formed of an elastic material magnetized by containing particles of a magnetic element that generates a magnetic force,
the magnetic force generating means is provided with a stair portion where a plurality of the flat plate magnets are provided in a stair shape in a depth direction of the belt from a core element of the belt to an intermediate portion between the core element and a surface of the belt, and a slope portion that is adjacent to the stair portion in the longitudinal direction of the belt and is provided to be inclined from the core element of the belt toward the surface of the belt.

9. A monitoring system of a conveyor belt comprising:
a magnetic force generating means that is provided inside of a belt; and
a magnetic sensor that is provided outside of the belt,
wherein a magnetic force generated by the magnetic force generating means is detected by the magnetic sensor to detect a condition of the belt,
the magnetic sensor is configured using an MI sensor, and
wherein an output voltage of the magnetic sensor, when an external magnetic field is zero, is not set to be 0 V.

* * * * *